Patented Sept. 13, 1932

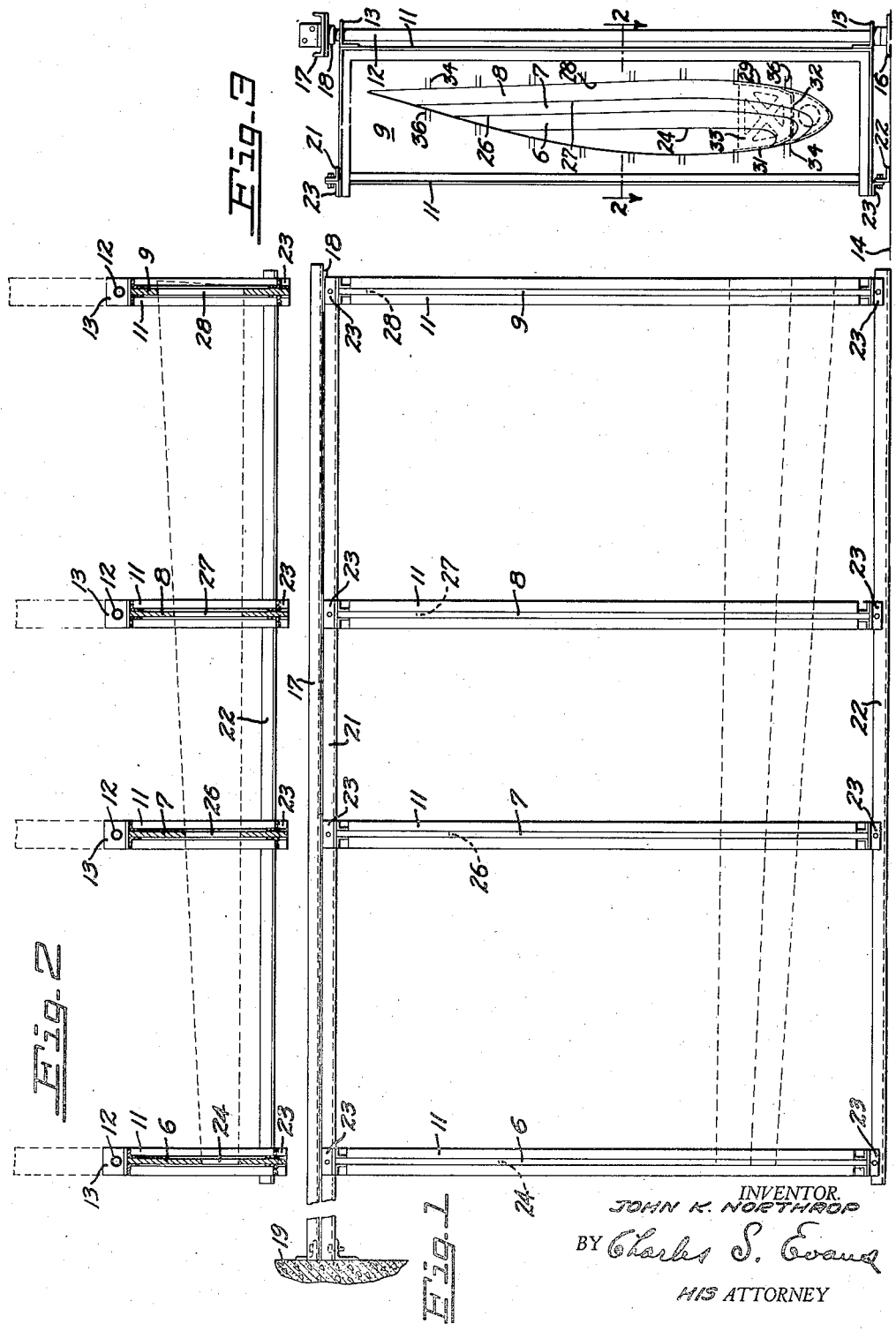

1,877,023

UNITED STATES PATENT OFFICE

JOHN K. NORTHROP, OF GLENDALE, CALIFORNIA, ASSIGNOR TO NORTHROP AIRCRAFT CORPORATION, OF LOS ANGELES, CALIFORNIA, A CORPORATION OF DELAWARE

METHOD OF CONSTRUCTING AIRFOILS

Application filed July 19, 1930. Serial No. 469,013.

My invention relates to the construction of airfoils, and particularly to the construction of right and left wing sections of matched dimensions.

It is among the objects of my invention to provide a method for the rapid and accurate fabrication of airplane wings.

A further object of my invention includes the provision of a jig mechanism by means of which the above object may be accomplished.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a longitudinal side elevation of the jig embodying my invention, showing part of a wing section in place.

Figure 2 is a sectional plan view looking down on the top of the jig as it appears in Figure 1, the plane of section being indicated by the line 2—2 of Figure 3.

Figure 3 is an end elevation of the right hand end of the jig as it appears in Figure 1.

Broadly stated my invention includes a method of conforming, or shaping airfoils to jigs, or forms, in such a manner as to produce accurately finished wing structures in which the right and left wing sections are of matched dimensions. The method is particularly applicable to the construction of all-metal wings, which are preferably built up of a plurality of nested longitudinal channels, the flanges of which form the shell of the airfoil. One form of device for attaining this end comprises a plurality of forms, such as apertured panels, outlining predetermined sections of the wing and held in spaced positions to form a jig. In order that the same jig may be used for both the right and left wing sections means are provided for reversing the relative positions of the panels, or other such outlining means, to produce a jig of opposite hand.

In greater detail, the apertured panels 6, 7, 8 and 9 are mounted in the supporting frames 11, which are pivotally attached to the fixed stanchions or posts 12 by the brackets 13. The posts 12 are mounted on the floor 14 in suitable hubs 16, and the upper ends of the posts are secured to a channel bar 17 by the flanged hubs 18; the channel bar being fixed to a suitable support, such as the wall 19. The upper and lower longitudinal bars 21 and 22 respectively are detachably secured to the angle brackets 23, fixed to the top and bottoms of the frames 11, to maintain the proper distance between the outer edges of the frames. And, in order to fix the frames in alignment, the lower angle bar 22 is detachably secured on the floor 14, and the upper angle bar 21 is detachably secured to a suitable support, such as the wall 19.

The apertures 24, 26, 27 and 28 are formed in the respective panels, and each conforms to the shape of the transverse section of the wing in the plane of the respective panel. There are numerous methods of using such a form to fabricate wing sections, but I have chosen for purpose of illustration, the method in which a wing is assembled from a plurality of longitudinal channels. These channels comprise the flanges 29 and 31, fixed to, or formed integrally with a web 32, and reinforced by suitable bulkheads 33 disposed along their length. When assembled, the channel flanges 29 and 31 form the shell of the airfoil.

To facilitate alignment of the channels in the jig, the gage lines 34 and 36 are inscribed on the various panels to indicate the proper position of the webs and channel edges respectively of the various channels. The channels are preferably first separately assembled on a bench; rivet holes being drilled or punched adjacent the outside edges of the flanges.

To assemble an airfoil, an assembled channel forming the leading edge of the wing is first inserted in the jig and pressed down into position in register with the gage lines 36, and so held while the succeeding channel is nested and clamped in position in alignment with the gage lines 34. By assembling each channel in register with the gage lines, accuracy in the assembly of the wing is assured.

In order to provide means for accurately joining the successive channels, the holes, previously punched, or drilled in the flange edges, are drilled on through the subjacent flanges, near the web of the succeeding channel. After a pair of rivet holes have been drilled in each end of a channel, suitable bolts are inserted to hold the adjacent channels while the remaining holes are drilled.

It is desirable that the punchings or drill cuttings that fall into the channels when the rivet holes are extended through be removed before the wing is finally assembled. To accomplish this, the channels are removed from the jig and all extraneous material is removed. The final riveting can then be completed either with the channels on a bench or in the jig. If time permits it is preferable to re-insert the channels in the jig because of the better accessibility, but equal accuracy can be obtained from a bench assembly as the rivet holes insure the proper alignment.

When set up as shown in the drawing, which I will term the obverse position, the jig will form a right hand wing section. To form the left hand wing section, the bars 21 and 22 are disconnected and the frames are swung about on the stanchions to the reverse positions as indicated by the dotted lines in Figure 2. The bars 21 and 22 are then replaced in position and the jig is ready to form a left hand wing section, which will exactly match the right hand section in all dimensions.

Such uniformity between the right and left wings is quite important, particularly for high speed ships, since a ship having dissimilar wings is cranky and difficult to control in the air. When it is desired to construct a constant speed cruiser having one wing longer than the other to compensate for the propeller torque, the necessary elongation can be provided for in the wing tip which is assembled separately and fixed in place after the wing section is removed from the jig.

I claim:

1. The method of fabricating an airplane wing from a plurality of members which comprises forming a jig defining the complete outline of a plurality of cross-sections through the assembled wing, conforming the members to a jig, and while in the conformed position conditioning the members for permanent assembly.

2. The method of fabricating an airfoil from a plurality of members, which comprises forming a jig defining the complete outline of a plurality of cross-sections through the assembled wing, conforming the members to a jig, and forming registered rivet holes in adjacent members while in the conformed position.

3. The method of fabricating right and left airplane wing sections, which comprises fabricating one section in conformity with a jig, reversing the jig, and fabricating the second section in conformity with the jig in reversed position.

4. The method of fabricating an airplane wing from a plurality of channel sections adapted when nested together to form a complete wing, which comprises forming a jig defining the outline of the assembled wing, placing markers on the jig to indicate the relative positions of the separate channels, conforming the channels to the jig and in register with the markers, and while in the jig conditioning the channels for permanent assembly.

5. The method of fabricating an airfoil from a plurality of members, which comprises conforming the members to a jig defining the complete outline of a plurality of cross sections through the assembled wing, and while in the conformed position conditioning the members for permanent assembly.

6. The method of fabricating an airfoil from a plurality of members of channel section adapted when nested together to form a wing, which comprises placing the members in a jig defining the complete outline of a plurality of cross sections through the assembled wing, conforming the members to the jig, and while in the conformed position conditioning the members for permanent assembly.

In testimony whereof, I have hereunto set my hand.

JOHN K. NORTHROP.